United States Patent [19]

Brasington et al.

[11] Patent Number: 4,764,541

[45] Date of Patent: Aug. 16, 1988

[54] PROCESS FOR PREPARING POLYURETHANE FOAMS IN THE PRESENCE OF A POLYETHER ACID

[75] Inventors: Robert D. Brasington, Chemin de la Noyelle, France; Werner A. Lidy, Collonge-Bellerive, Switzerland

[73] Assignee: BP Chemicals Limited, London, England

[21] Appl. No.: 146,695

[22] Filed: Jan. 21, 1988

[30] Foreign Application Priority Data

Jan. 29, 1987 [GB] United Kingdom ............... 8701993

[51] Int. Cl.$^4$ ............................................. C08J 9/16
[52] U.S. Cl. .................................... 521/114; 521/116; 521/157
[58] Field of Search .................. 521/114, 116, 157

[56] References Cited

U.S. PATENT DOCUMENTS

| 3,965,150 | 6/1976 | Moeller | 521/112 |
| 3,974,109 | 8/1976 | Papa et al. | 521/166 |
| 4,452,924 | 6/1984 | Radovich | 521/111 |
| 4,546,122 | 10/1985 | Radovich et al. | 521/164 |
| 4,569,952 | 2/1986 | Radovich et al. | 521/167 |
| 4,701,474 | 10/1987 | Bailey, Jr. et al. | 521/137 |

Primary Examiner—Morton Foelak
Attorney, Agent, or Firm—Murray and Whisenhunt

[57] ABSTRACT

A flexible polyurethane foam formulation which is non-reactive at or near ambient temperature is provided. The formulation comprises a polyisocyanate, a polyfunctional active hydrogen containing compound, an amine catalyst, a blowing agent and a polyether acid. The formulation which becomes reactive above 40° C. has the advantage, over similar systems based on formic acid, that the polyurethane foam is not tight and does not suffer from skin peeling.

5 Claims, 1 Drawing Sheet

PROCESS FOR PREPARING POLYURETHANE FOAMS IN THE PRESENCE OF A POLYETHER ACID

The present invention relates to polyurethane foam formulations and to a process for preparing polyurethane foam. In particular the invention relates to the use of polyether acids to delay or slow down the rate of polyurethane foam formation in such processes.

It is known that formic acid can be used to slow down the rate of flexible polyurethane formation in formulations which use amines as a catalyst (see for example J. Cellular Plastics ((Sept/Oct) 250 (1975)). It is believed that when the formic acid is added to the formulation it reacts with the amine forming a formate salt of the amine which is catalytically inactive. It is also known that raising the temperature of such formulations restores catalytic activity hence it is thought that at higher temperatures the formate salt of the amine dissociates into formic acid and amine and that the amine, once released, catalyses the polyurethane forming reaction.

The technique described above is especially useful in the manufacture of moulded flexible polyurethane foam parts where it is desirable to make the moulding time as short as possible (rapid demould applications). In such situations the polyurethane foam formulation requires very high catalyst concentrations to ensure fast curing. Without the use of formic acid to delay the polyurethane forming reaction, the formulation reacts so quickly that it becomes too viscous to flow easily either during pouring or within the mould. The technique is also useful in producing flexible polyurethane slab.

A problem arises however when formic acid is used in such rapid demould applications. In certain formulations it is noticeable that the use of formic acid leads to foam tightness and to peeling of the skin of the polyurethane.

A class of acids has now been identified which, whilst exhibiting the properties of formic acid described above, do not suffer the drawbacks described above. The class of acids identified are hereafter termed polyether acids.

Accordingly, the present invention provides a polyurethane foam formulation, which is non-reactive at ambient temperatures, prepared by mixing a polyisocyanate, a polyfunctional active hydrogen containing compound, an amine catalyst, a blowing agent and a polyether acid.

The polyisocyanate components employed in this invention are preferably those having the general formula:

$$Q(NCO)_i$$

wherein i is an integer of two or more and Q is an organic radical having the valence of i. Q can be a substituted or unsubstituted hydrocarbon group (e.g an alkylene or an arylene group). Q can also be a group having the formula Q'—Z—Q' where Q' is an alkylene or arylene group and Z is —O—, —O—Q'—, —CO—, —S—, —S—Q'—S—, or —SO$_2$—. Examples of such compounds include hexamethylene diisocyanate, 1,8-diisocyanato-p-menthane, xylene diisocyanate, 1-methyl-2,4-diioscyanatocyclohexane, phenylene diisocyanate, tolylene diisocyanates, chlorophenylene diisocyanates, diphenylmethane-4,4'-diisocyanate, naphthalene-1,5-diisocyanate, triphenylmethane-4,4',4"-triisocyanate, and isopropylbenzenealpha-4-diisocyanate.

Q can also represent a polyurethane radical having a valence or i in which case $Q(NCO)_i$ is a composition conventionally known as a pre-polymer. Such pre-polymers are formed by reacting a stoichiometric excess of a polyisocyanate as set forth hereinbefore and hereinafter with an active hydrogen-containing component as set forth hereinafter, especially the polyhydroxyl or polyamine containing materials.

Further included among the isocyanates useful in this invention are the dimers and trimers of isocyanates and diisocyanates and polymeric diisocyanates such as those having the general formula:

$$[Q''(NCO)_i]_j$$

in which i and j are each integers of two or more, and Q" is a polyfunctional organic radical, and/or, as additional components in the mixtures, compounds of the general formula:

$$L(NCO)_i$$

in which i is one or more and L is a monofunctional or polyfunctional atom or radical. Examples of this type include ethylphosphonic diisocyanate, $C_2H_5P(O)$—N(-NCO)$_2$; isocyanates derived from sulfonamides (QSO$_2$NCO), cyanic acid, and thiocyanic acid.

More specifically, the polyisocyanate component employed in this invention also includes the following specific compounds as well as mixture of two or more of them; 2,4-tolylene diisocyanate, 2,6-tolylene diisocyanate, crude tolylene diisocyanate, bis(4-isocyanatophenyl) methane (MDI), polyphenylmethylene polyisocyanates that are produced by phosgenation of aniline formaldehyde condensation products (crude MDI), dianisidine diisocyanate, toluidine diisocyanate, xylylene diisocyanate, bis(2-isocyanatoethyl) fumarate, bis(2-isocyanatoethyl) barbonate, 1,6-hexamethylene-diisocyanate, 1,4-tetramethylene-diisocyanate, 1,10-decamethylene-diisocyanate, cumene-2,4-diisocyanate, 4-methoxy-1,3-phenylene-diisocyanate, 4 chloro-1,3-phenylenediisocyanate, 4-bromo-1,3-phenylenediisocyanate, 2-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, bis 5,6-(2-isocyanatoethyl)(bicyclo 2.2.1)hept-2-ene, benzidenediisocyanate, 4,6-dimethyl-1,1,3 phenylene 9.10-anthracenediisocyanate, 4,4'-diisocyanatodibenzyl, 3,3-dimethyl-4.4'-diisocyanatodiphenylmethane, 2,6-dimethyl-4,4'diisocyanatodiphenyl, 2,4-diisocyanatostilbene, 3,3'-dimethoxy-4,4'-diisocyanatodipheyl, 1,4-anthracene diisocyanate, 2,5-fluorenediisocyanate, 1,8-naphthalene diisocyanate, 2,6-diisocyanatobenzfuran, 2,4,6-toluene triisocyanate, and many other organic polyisocyanates that are known in the art, such as those that are disclosed in an article by Siefken, Ann. 562, 75 (1949).

Most preferably the polyisocyanate is selected from TDl, MDl, mixtures of TDI and MDI and prepolymers of TDI, MDI or such mixtures.

As regards the polyfunctional active hydrogen containing compound, this is a compound containing at least two and not usually more than six hydrogens which are reactable with isocyanate groups. Examples of groups containing active hydrogens are hydroxyl groups, amine groups and amide groups. A suitable class of polyfunctional active hydrogen containing compounds are the polyhydroxyl compounds such as polyols. When a polyol is used it is preferably a polyether polyol produced by alkoxylation of (1) low molecular weight diols and triols or naturally occurring polyols (2) non reducing sugars and drivatives thereof (3) phosphoric, phosphorus, and polyphosphoric acids. Examples of such compounds are the alkylene oxide adducts of ethylene glycol, propylene glycol, glycol, glycerol, the isomeric butanediols, hexanediols, octanediols and the like. Alkylene oxide adducts of pentaerythritol, sorbitol, arabitol, mannitol alkyl glucoside, alkylene glycol glucosides and glycerol glucosides are also contemplated. The polyol may also be a polyester polyol or a polytetramethylene glycol.

In general it is desirable that the alkylene oxide used to form the adduct is a lower alkylene oxide having from 2 to 4 carbon atoms. Preferred examples are ethylene oxide, propylene oxide, the butylene oxides or mixtures thereof.

With such a large number of polyols available for use with the above invention, the choice of polyol will depend very much upon the application for which the polyol is used. For example the choice will reflect the choice of physical characteristics for the final polyurethane. In choosing the polyol, an important consideration is its hydroxyl number, that is the average number of free hydroxyl groups per polyol molecule, since this reflects the number of sites available, on the polyol for reaction with isocyanate. Broadly speaking, the larger the hydroxyl number of the polyol the more sites available for participation in the urethane linkage forming reaction and hence the more rigid the foam or elastomer formed. The hydroxyl number of the polyol is conveniently between 10–150 and preferably between 20 and 60.

The polyols should have viscosities in the range 100–5000 centipoise at ambient temperature, preferably in the range 100–2000.

Included within the definition of polyol are those polyether polyols onto which has been grafted polymeric materials. Such polymer polyols comprise for example a polyether polyol of the type described above modified, by grafting, to include a polymer of one or more ethylenically unsaturated monomers. Typically the polymer is a copolymer of styrene and acrylonitrile. Preferably the level of polymer in such polymer polyols is such as to comprise between 10 and 60% by weight of the total.

As the polyurethane forming reaction is base catalysed, the presence of amines in the formulation increases the rate of reaction. For the formulations contemplated herein suitable amines include tertiary amines and urea. Examples include triethylamine, tributylamine, N-methyl morpholine, N,N,N',N'-tetramethylethylene diamine, 1,4-diazabicyclo-(2,2,2)-octane, N,N-dimethyl benzylamine, bis-(N,N-diethylaminoethyl)-adipate, N,N-dimethylcyclohexylamine, tetramethyl hexamethylene diamine, piperazine, 1,2-dimethyl imidazole, 2-methylimidazole. Tertiary amines having isocyanate-reactive hydrogen atoms can also be used and examples include triethanolamine tripropanolamine, triisopropanolamine, N-methyl diethanolamine, N-ethyl diethanolamine, N,N-dimethylethanolamine and their reactions products with ethylene oxide and/or propylene oxide.

The blowing agent used is suitably either water or a volatile organic compound. Suitable volatile organic blowing agents include acetone ethyl acetate, methylene chloride, chloroform, ethylidene chloride, vinylidene chloride, monofluorotrichloromethane, chlorodifluoromethane, dichlorodifluoromethane, butane, hexane, heptane and diethyl ether.

The polyether acids used in the present process to slow down/delay the polyurethane forming reaction are compounds having the formula:

$$ROCH_2CH_2O(CH_2CH_2O)_n(CH_2CH(CH_3)O)_mR^1$$

where m and n are independently zero or an integer from 1 to 20, R is selected from $C_1$ to $C_6$ alkyl groups, $-CH_2CO_2H-CO(CH_2)_2CO_2H$ or hydrogen and $R^1$ is either $-CH_2CO_2H$ or $CO(CH_2)_2CO_2H$. Examples of such acids include $CH_3OCH_2CH_2OCH_2CO_2H$, $CH_3O(CH_2CH_2O)_2CH_2CO_2H$, $HO_2CCH_2O(CH_2CH_2O)_2CH_2CO_2H$, $HO_2CCH_2O(CH_2CH_2O)_pCH_2CO_2H$ (p=10–12), $HOCH_2CH_2O(CH_2CH_2O)_qCH_2CH_2CO_2H$ (q=1–20) and $HOCH_2CH_2OCH_2CO_2H$. A preferred polyether acid is $HO_2CCH_2O(CH_2CH_2O)_pCH_2CO_2H$ (q=10–12) as it produces a salt soluble in the formulation.

The polyether acid should be present in the formulation in amounts such that there are at least sufficient carboxylic acid groups present to react with at least 5 mole % of the amine catalyst preferably 10–80 mole %. Preferably the polyether acid and the amine are prereacted before addition to the formulation to form the acid salt of the amine.

The polyurethane foam formulations of the present invention are characterised by being non-reactive (i.e. non-foaming) at ambient temperatures. By ambient temperatures is meant a temperature between 10° and 35° C.

Formulations of the type described above can be used in polyurethane foam moulding where it is necessary to achieve rapid demould times. Accordingly in an embodiment of the present invention there is provided a process for preparing polyurethane foam which comprises (1) preparing a polyurethane foam formulation as described above at ambient temperature, (2) introducing the polyurethane foam formulation into a mould, under conditions such that the polyurethane forming reaction substantially occurs when the polyurethane foam formulation is in the mould.

A process of the type described above can be achieved by preparing the polyurethane foam formulations at ambient temperature and pouring into a mould heated to between 40° and 60° C. The mould is then closed and foaming allowed to take place. Once the foaming has taken place the polyurethane foam can be cured and demoulded in the usual way.

The invention is now illustrated by the following Examples.

EXAMPLE 1 AND COMPARATIVE TESTS A AND B

Three separate formulations were prepared at 25° C. and poured into 9 liters moulds maintained at 40° C. The foam of Comparative Test B started to cream and foam immediately upon formulation. Each mould was closed when addition was complete and the contents demoulded 2 minutes later. The demoulded parts were inspected visually giving the following results.

EXAMPLE 1 (POLYGLYCOLLIC ACID)

Good cure after 2 minutes with no skin peeling and a minimum of shrinkage.

Comparative Test A (Formic Acid)

Good cure after 2 minutes but serious shrinkage and skin peeling.

Comparative Test B (No Additive)

Serious permanent deformation of foam.

| Formulation (parts by weight) | Example | Comparative Test A | Comparative Test B |
| --- | --- | --- | --- |
| Polyol 1315 | 100 | 100 | 100 |
| Water | 3 | 3 | 3 |
| Amine A1 | 0.1 | 0.1 | 0.05 |
| Amine 33LV | 1.4 | 1.4 | 0.7 |
| DBTL/RC2044 | 0.8 | 0.8 | 0.8 |
| Silicone RS 120 | 0.7 | 0.7 | 0.7 |
| Silicone SH 209 | 1.0 | 1.0 | 1.0 |
| Iso 80/20 TDI/MDI index | 100 | 100 | 100 |
| Polyglycollic Acid | 0.4 | — | — |
| Formic Acid | — | 0.08 | — |

TABLE
Polyol 1315 = a mixture of 30% polyol CP2 (polyether polyol ex BP Chemicals) and 70% polyol PP2 (polymer polyol ex BP Chemicals)
Amine A1 = catalyst ex UCC
Amine 33LV = catalyst ex UCC
DBTL/RC2044 = tin catalyst (ex BP Chemicals)
Silicone RS 120 = silicone surfactant (ex BP Chemicals)
Silicone SH 209 = silicone surfactene (ex BP Chemicals)
ISO 80/20 TDI/MDI = 80% by cut TDI (80:20) and 20% by at crude MDI
Polyglycollic acid = $HO_2CCH_2(OCH_2CH_2)_pOCH_2CO_2H$ (where $p$ = 10-12)

We claim:

1. A process for preparing a flexible polyurethane foam which process comprises
   (1) preparing a polyurethane foam formulation by mixing a polyisocyanate, a polyfunctional active hydrogen containing compound, an amine catalyst, a blowing agent and a polyether acid at ambient temperature; and
   (2) thereafter foaming the polyurethane foam formulation in a mould at a temperature in the range 40° to 60° C.

2. A process as claimed in claim 1 wherein the polyurethane foam formulation is cured and demoulded after step (2).

3. The process as claimed in claim 1 wherein the polyether acid is selected from the group consisting of $CH_3OCH_2CH_2OCH_2CO_2H$, $CH_3O(CH_2CH_2O)_2CH_2CO_2H$, $HO_2CCH_2O(CH_2CH_2O)_2CH_2CO_2H$, $HO_2CCH_2O(CH_2CH_2O)_pCH_2CO_2H$ (p=10-12), $HOCH_2CH_2O(CH_2CH_2O)_qCH_2CH_2CO_2H$ (q=1-20) and $HOCH_2CH_2OCH_2CO_2H$.

4. The process as claimed in claim 1 wherein the polyether acid is $HO_2CCH_2O(CH_2CH_2O)_pCH_2CO_2H$ (p=10-12).

5. The process as claimed in claim 1 wherein the polyether acid is present in amounts such that the number of carboxylic acid groups present comprise between 10 and 80 mole % of the amine catalyst.

* * * * *